Feb. 25, 1958  R. S. CHILDS  2,824,449
CAPACITANCE-TYPE FLUID MEASURING APPARATUS
Filed July 29, 1953
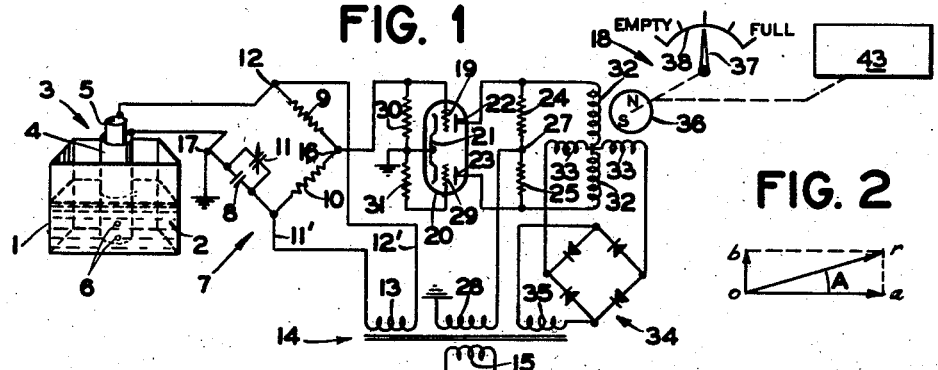
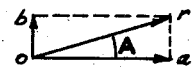
FIG. 2
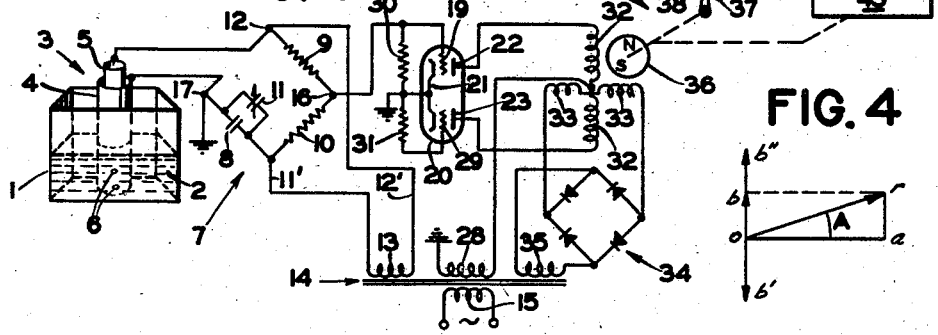
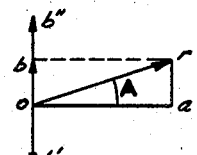
FIG. 4
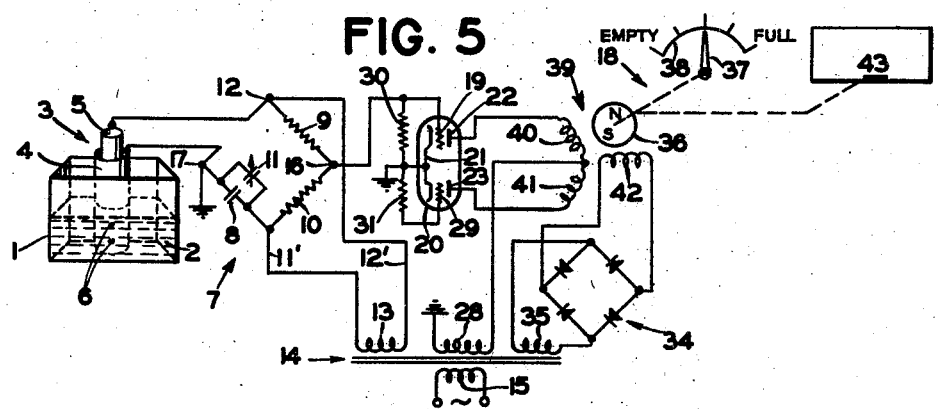
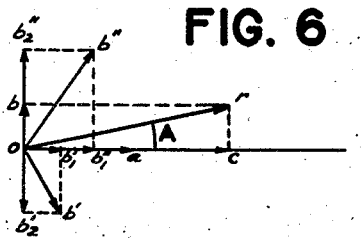
FIG. 6
INVENTOR
ROBERT S. CHILDS
BY Tyler S. Roundy
ATTORNEY United States Patent Office 2,824,449
Patented Feb. 25, 1958

2,824,449

CAPACITANCE-TYPE FLUID MEASURING APPARATUS

Robert S. Childs, Sudbury, Mass., assignor to Bendix Aviation Corporation, Teterboro, N. J., a corporation of Delaware Application July 29, 1953, Serial No. 371,050

9 Claims. (Cl. 73—304)

The present invention relates to measuring and/or control apparatus and particularly to apparatus for measuring and/or controlling the level or quantity of fluid present in a container.

Conventional fluid contents gages for measuring the level or quantity of a fluid in a container employ an alternating current bridge having in its measuring arm a measuring condenser adapted for immersion in the fluid to an extent dependent upon the level or quantity of fluid present in the container so that the capacitance of the measuring condenser varies with variation in fluid level to unbalance the bridge to transmit an unbalance signal to indicating means.

In one such known arrangement, the unbalance signal appearing in the output of the A. C. bridge is simply amplified by a conventional vacuum tube amplifier supplied from a separate D. C. source and the amplified unbalance voltage is applied as one of two separate A. C. input voltages to a special rectifier circuit for a differentially connected direct current measuring instrument. The A. C. source supplies the second A. C. input voltage. When the bridge becomes unbalanced, two direct currents of variable magnitude are supplied to the measuring instrument, one current being a function of the difference of the two A. C. input voltages while the other current is a function of the sum of the two A. C. input voltages. In this known arrangement the measuring instrument serves simply as a null indicator, the comparison or reference condenser in the bridge being made adjustable and calibrated in units of fluid quantity so as to rebalance the bridge by returning the pointer of the measuring instrument from its left or right hand position to a center-scale null condition after each bridge unbalance caused by increase or decrease in fluid level.

It is an object of the present invention to provide new and improved apparatus for measuring or controlling a physical condition or quantity.

It is another object of the present invention to provide a fluid contents gage of simple rugged construction.

It is a further object of the present invention to provide a fluid contents gage which does not employ a null type indicator but which is sensitive to even small changes in the quantity of the fluid being measured.

It is another object of the present invention to provide, in a fluid contents gage of the type employing a balanceable network connected to an indicator, electronic valve or amplifying means cooperating in a novel manner between the network and indicator to control the indicator field in accordance with changes in the fluid quantity being measured.

It is a further object of the present invention to provide a fluid contents gage employing a direct current position indicator as its fluid contents indicating means and which is not only sensitive to small changes in fluid quantity but is also insensitive to variations in the source voltage or source frequency.

Additional objects and novel features of the present invention will become more apparent after consideration of the specification and accompanying drawing wherein like reference numerals indicate similar elements and wherein:

Fig. 1 is a schematic diagram of a preferred form of fluid contents gage in accordance with the present invention;

Fig. 2 is a vector diagram illustrating the directions of the unidirectional fields developed in the indicating device of Fig. 1;

Fig. 3 is a schematic diagram of a somewhat modified form of gage according to the invention;

Fig. 4 is a vector diagram illustrating the directions of the unidirectional fields developed in the indicating device of Fig. 3;

Fig. 5 is a schematic diagram of another form of gage constructed in accordance with the present invention; and Fig. 6 is a vector diagram illustrating the directions of the fields developed in the indicating device of Fig. 5.

Referring to Fig. 1, there is indicated at 1 a container for a fluid 2. A measuring condenser indicated generally at 3 is suitably mounted in container 1 for vertical immersion of its concentric cylindrical electrodes 4 and 5 in a dielectric fluid 2 to an extent which depends upon the level of the fluid in the container. The dielectric fluid may be aircraft fuel and the container an aircraft fuel tank. Cylindrical electrode 4 is provided with suitably located apertures 6 so that the level of the fluid between electrodes 4 and 5 will always be the same as the level of fluid in the rest of the container.

The theory of operation of conventional fluid contents gages depends upon the following considerations. When the container is empty the dielectric between electrodes 4 and 5 will be air which has a dielectric constant value which is unity. When the container is completely filled with a dielectric fluid the dielectric constant between electrodes 4 and 5 will exceed unity and will have a value depending upon the composition of the particular fluid present. Since the capacitance of measuring condenser 3 varies directly with the dielectric constant of the dielectric material or materials between its electrodes, it will be appreciated that the capacitance of condenser 3 decreases progressively as the fluid level falls from a full tank condition to an empty tank conditions. Thus, by measuring the capacitance of condenser 3 an indication of fluid level or quantity may be obtained.

The measuring condenser 3 is connected in the measuring arm of a bridge indicated generally at 7. A reference or comparison condenser 8 is connected in the reference arm of the bridge. Impedances such as resistors 9 and 10 complete the bridge. The bridge input terminals 11 and 12 are connected via conductors 11' and 12' to the secondary winding 13 of a power transformer indicated generally at 14. The primary winding 15 of transformer 14 is connected to a suitable source (not shown) of alternating voltage, which in the case of an aircraft fuel gage could be the 115 volt, 400 cycle supply line.

If the resistance values of resistors 9 and 10 are equal, then zero calibration of the bridge when the container is empty may be obtained by adjusting the capacitance in the reference arm, for example, by means of the trimmer condenser 11, until the reference arm capacitance equals the "empty" capacitance of the measuring condenser 3. When this condition occurs the bridge is balanced so that zero voltage appears between bridge output terminal 16 and the grounded output terminal 17, thereby producing an "empty" indication on the scale of the indicating device 18 as will be hereinafter explained in detail.

In accordance with the present invention, the bridge output terminal 16 is electrically coupled to the control electrode, such as grid 19 of one section of a double triode vacuum tube 20, the common cathode or electron emitter 21 for the two sections being connected to ground. The two sections may be separate vacuum tubes instead if so desired. Anodes or collectors 22 and 23 are coupled through respective load resistors 24 and 25 of equal resistance values to a junction point 27 which is connected to one end of a secondary winding 28 of transformer 14, the other end of winding 28 being grounded. Control grids 19 and 29 are biased at the same potential with respect to their common cathode. In the embodiments illustrated, the control grids are connected to their grounded cathode via respective grid resistors 30 and 31 of equal resistance values so that the grids are zero biased and when the bridge is balanced the two sections conduct simultaneously to an equal extent on the positive half cycles of the source voltage appearing across secondary winding 28. The pulsating D. C. voltage drops developed across resistors 24 and 25 oppose each other so that under balanced bridge conditions there results a net pulsating D. C. voltage of zero magnitude across the series combination of resistors 24 and 25.

The polarities of secondary windings 13 and 28 and the bridge connections are chosen such that with fluid present in the container to produce bridge unbalance the unbalance potential appearing at output terminal 16 with respect to the grounded output terminal 17 is substantially 180° out of phase with the A. C. potential applied to junction point 27 and anodes 22 and 23 with respect to ground. This means that as the magnitude of the unbalance voltage impressed on grid 19 increases with increasing fluid level the conduction from cathode 21 to anode 22 on the positive half cycles of the source correspondingly decreases and hence the pulsating D. C. voltage drop across resistor 24 also decreases. Since the potential of grid 29 is not influenced by the unbalance voltage from the bridge, the conduction from cathode 21 to anode 23 and the voltage drop across resistor 25 remain substantially constant during operation of the apparatus over its entire range from empty to full tank conditions. Thus, with fluid present in the container to produce bridge unbalance there will be developed across the series combination of resistors 24 and 25 a net pulsating D. C. voltage of a magnitude which varies directly with the degree of bridge unbalance. Accordingly, when the tank 1 is completely filled with fuel so that measuring condenser 3 has a maximum capacitance value, the net unidirectional voltage appearing across the series combination of resistors 24 and 25 will have a maximum value.

Alternatively, the polarity of winding 13 or of winding 28 or the bridge connections may be reversed so that the unbalance A. C. voltage applied to grid 19 with respect to ground may be substantially in phase with the A. C. potential applied to the junction point 27 and to anodes 22 and 23. This would result in increasing rather than decreasing the conduction from cathode 21 to anode 22 during the positive half cycles of the source and would thus have the effect of reversing the polarity of the net unidirectional voltage appearing across the series combination of resistors 24 and 25.

Shown generally at 18 is an indicating device. Device 18 may be a direct current position indicator or a ratiometer which includes a field winding 32 connected in parallel across the series combination of resistors 24 and 25 and a field winding 33 wound approximately 90° apart from winding 32, or in quadrature, so that when windings 32 and 33 are energized by unidirectional currents they will establish respective unidirectional magnetic fields which are angularly displaced in space approximately 90° from each other, that is in quadrature.

Winding 33 is supplied with a unidirectional current of substantially fixed magnitude by means of a full-wave bridge type rectifier 34 which has its input terminals connected across secondary winding 35 of transformer 14. It will be appreciated that by virtue of this arrangement any fluctuations in the magnitude or frequency of the source coupled to the input of the measuring bridge 7 which would otherwise introduce an error in the reading of indicator 18 will be substantially compensated by a corresponding corrective influence exerted on the field of winding 33 by secondary winding 35 and bridge rectifier 34.

The indicating device 18 has a rotor which may be a permanent magnet rotor permanently magnetized across a diameter thereof so as to align itself with the axis of the resultant field produced by windings 32 and 33. When rotor 36 rotates it turns a pointer 37 which moves over a scale 38 calibrated in units of fluid level or fluid quantity.

As previously described, when tank 1 is empty and bridge 7 is balanced, the net unidirectional voltage appearing across the series combination of resistors 24 and 25 is zero and hence there is no current through winding 32 to develop a field at right angles to the constant field established by winding 33. Thus, under empty tank conditions the rotor will line up with the magnetic field of winding 33 and position pointer 37 on the "empty" mark of scale 38.

As stated previously, when fluid is present in the tank, a net unidirectional voltage appears across the series combination of resistors 24 and 25 having a magnitude which is a direct function of the degree of bridge unbalance and hence a direct function of the level or quantity of fluid present in the container. Hence, a unidirectional current will flow through winding 32 and develop a unidirectional magnetic field, represented by vector *ob* in Fig. 2, of a magnitude which is a direct function of the level or quantity of fluid present in the container. As indicated in Fig. 2, the field *ob* combines with the field *oa* established by winding 33 to yield a resultant magnetic field *or* which is the vector sum of fields *oa* and *ob* and is displaced from the axis of field *oa* by an angle A which is proportional to the level or quantity of fluid present in the tank. The magnetized portion of rotor 36 will line up with the axis of the resultant field *or* and position the pointer 37 at the appropriate mark on scale 38 to indicate the quantity of fluid present in the tank.

The gage illustrated in Fig. 3 is similar to the gage of Fig. 1 except that the anode load resistors 24 and 25 are omitted and the winding 32 is provided with a center tap which is connected to the ungrounded end of transformer secondary winding 28. It will be appreciated that when tank 1 is empty and bridge 7 is balanced the two halves of winding 32 will develop equal but opposed unidirectional fields at right angles to the constant field established by winding 33. Thus, as in the case of the gage of Fig. 1, the rotor will line up with the unidirectional field established by winding 33 and the pointer will be positioned at the empty scale mark.

Fig. 4 illustrates vectorially the fields produced in the gage of Fig. 3 when there is fluid present in the tank and the bridge is unbalanced. Vector *ob''* represents the fixed unidirectional field established in the lower half of winding 32 by the constant current flowing from anode 23, while vector *ob'* represents the opposing unidirectional field developed by the current flowing from cathode 21 to anode 22 and through the upper half of winding 32. The effective field produced by the subtraction of field *ob'* from field *ob''* is represented by vector *ob*. Field *ob* combines with the field *oa* established by winding 33 to produce the resultant field *or* which is the vector sum of fields *oa* and *ob* and is displaced from field *oa* by an angle A which is proportional to the level or quantity of fluid present in the tank. Rotor 36 will line up with field *or* and position pointer 37 so as to indicate the level or quantity of fluid present.

In the modified gage of Fig. 5 there is employed a direct current position indicator 39 having three field windings 40, 41 and 42 wound approximately 120° apart so that when energized by unidirectional current they will establish, respectively, three unidirectional fields displaced from each other by approximately 120°. When the tank is empty and the bridge is balanced unidirectional currents of equal magnitude will flow through series-aiding windings 40 and 41. These currents will develop equal but opposed unidirectional field components at right angles to the fixed field established by winding 42. These currents will also develop unidirectional field components in alignment with the fixed field established by winding 42. Thus, under a balanced bridge condition when the tank is empty, the rotor will line up with the resultant unidirectional field which is the sum of the field established by winding 42 and the field components in alignment with the latter field and produced by windings 40 and 41. The aligned rotor will locate pointer 37 on the "empty" mark.

Fig. 6 illustrates vectorially the fields produced in the gage of Fig. 5 when there is fluid in the tank and the bridge is unbalanced. Vector $oa$ represents the fixed unidirectional field established by the constant current flowing through winding 42. Vector $ob''$ represents the fixed unidirectional field established in winding 41 by the constant current from anode 23. Field $ob''$ has a component $ob_1''$ in alignment with field $oa$ and a component $ob_2''$ at right angles with field $oa$. Vector $ob'$ represents the unidirectional field developed in winding 40 by the current from anode 22. Field $ob'$ has a component $ob_1'$ in alignment with field $oa$ and a component $ob_2'$ at right angles to field $oa$. Vector $ob$ represents the effective field component at right angles to field $oa$ produced by the subtraction of field component $ob_2'$ from field component $ob_2''$. Field $ob$ combines with the sum of the field $oa$ and field components $ob_1'$ and $ob_1''$ to produce the resultant or total field $or$ which is the vector sum of fields $oa$, $ob'$ and $ob''$. Total field $or$ is displaced from field $oa$ and field components $ob_1'$ and $ob_1''$ by an angle A which is proportional to the level or quantity of fluid present in the tank. Rotor 36 will line up with field $or$ and position the pointer to indicate the fluid level or quantity present.

In those applicatoins where it is desirable to control the magnitude of the condition being sensed, suitable control means 43 of known type may be employed to effect such control. For example, in the embodiments described herein, suitable switch means may be coupled to rotor 36 and be adapted to close when the fuel falls to a predetermined level to energize an electric motor which in turn controls a fuel pump for refilling tank 1 with fuel or connects in a reserve tank with its pump.

It will be appreciated that the apparatus according to the present invention not only is sensitive to small changes in the magnitude of the condition being measured but also is insensitive to fluctuations in the source voltage or source frequency for two reasons. Because of the balanced arrangement made possible by the provision of the two vacuum tube sections, variations in the voltage applied to anode 22 of the first section will also be experienced by anode 23 of the second section so that variations in differential current become second order. Also, by supplying the bridge input and fixed field winding of the indicator from the same source, variations in the signal field winding means and the fixed field winding means produced by source variations are essentially the same so that no false rotation of the rotor will occur.

It is to be understood that the expression "dielectric fluid" includes dielectric liquids and dielectric material in particle, powder or granule form.

It is also to be understood that the invention is not limited in its application merely to fluid contents gages or capacitance measuring apparatus but rather may be embodied in apparatus for measuring and/or controlling other physical conditions or quantities.

While I have illustrated and described certain specific embodiments of my invention by way of example, it will be apparent to those skilled in the art that various changes and modifications may be made in the form of the apparatus disclosed without departing from the spirit of my invention as defined by the appended claims.

What is claimed:

1. Apparatus for measuring the quantity of a dielectric fluid present in a container, comprising a measuring condenser having its electrodes adapted for mounting in the container for immersion in the fluid therein to an extent depending upon the level of the fluid therein so that its capacitance changes with the fluid level, an electrical bridge having said measuring condenser connected in its measuring arm and having its input adapted to be electrically coupled to a source of alternating current to produce bridge balance when the container is empty and to develop in its output when there is fluid present in the container an unbalance voltage of a magnitude which is a function of the quantity of fluid present in the container, indicating means having a rotor and first and second field winding means, means for energizing said first winding means with unidirectional current to establish a first unidirectional field of substantially constant magnitude during the operation of the apparatus tending to hold said rotor in a first angular position, first and second amplifying devices each having a control electrode, an electron emitter and a collector, means for electrically coupling the control electrode of said first device to the output of said bridge to receive and amplify said unbalance voltage and for connecting the control electrode of said second device so that said last-mentioned electrode does not receive said unbalance voltage, means for maintaining the control electrodes of said devices at substantially the same potential when said bridge is balanced, means for electrically coupling the emitter and collectors of said devices to the source so that said devices conduct on the same half cycles of the source voltage to an equal extent when said bridge is balanced and when said bridge is unbalanced the conduction of said second device remains substantially unchanged while the conduction of said first device is changed to an extent depending upon the magnitude of the unbalance voltage when said bridge is unbalanced, and means including said amplifying devices and utilizing the difference in the currents flowing therethrough upon bridge unbalance for energizing said second winding means to produce a second unidirectional field of an effective magnitude which is a function of the magnitude of the unbalance voltage and angularly displaced with respect to said first field to produce a resultant unidirectional field which locates said rotor in an angular position corresponding to the quantity of fluid present in the container.

2. Apparatus according to claim 1 wherein the polarities of the bridge connections and of the connections for connecting the emitters and collectors to the source are such that the unbalance voltage supplied to the control electrode of said first device is substantially 180° out of phase with the source voltage supplied to the collectors of said devices, whereby upon bridge unbalance the control electrode of said first device causes the current flowing through said first device to have a value less than the value of the current flowing through said second device to an extent depending upon the degree of bridge unbalance.

3. Apparatus according to claim 1 wherein the emitter-collector circuits of said devices are adapted to be electrically coupled in parallel circuit relation across the source.

4. Apparatus for measuring the quantity of a dielectric fluid present in a container, comprising a measuring condenser having its electrodes adapted for mounting in the container for immersion in the fluid therein to an extent depending upon the level of the fluid therein so that its capacitance changes with the fluid level, an electrical bridge having said measuring condenser connected in its measuring arm and having its input adapted to be electrically coupled to a source of alternating current to produce bridge balance when the container is empty and to develop in its output when there is fluid present in the container an unbalance voltage of a magnitude which is a function of the quantity of fluid present in the container, first and second electron discharge amplifying devices each having a cathode adapted to be electrically coupled to one side of the source and each also having a control electrode and an anode, a first anode load impedance having one terminal connected to the anode of said device, a second anode load impedance having one terminal connected to the anode of said second device and having an impedance value substantially equal to the value of said first load impedance, means for connecting the other terminals of said impedances to a common junction point which point is adapted to be electrically coupled to the other side of the source, means for electrically coupling the control electrode of said first device to the output of said bridge to receive and amplify said unbalance voltage and for connecting the control electrode of said second device so that said last-mentioned electrode does not receive said unbalance voltage, means for maintaining the control electrodes of said devices at substantially the same potential when said bridge is balanced so that said devices conduct simultaneously on the same half cycles of the source voltage to an equal extent when said bridge is balanced to produce a net zero voltage drop across the series combination of said impedances and when said bridge is unbalanced the conduction of said second device remains substantially unaltered while the conduction of said first device is altered to an extent depending upon the magnitude of the unbalance voltage to produce a net unidirectional voltage drop across said series combination which is of a magnitude dependent upon the magnitude of the unbalance voltage, and fluid quantity indicating means having a permanent magnet rotor and having first and second winding means wound at approximately 90° with respect to each other, means for passing unidirectional current through said first winding means to establish a first unidirectional field substantially constant in strength during the operation of said apparatus and tending to hold the magnetized portion of said rotor in alignment therewith, said second winding means being connected in parallel across the series combination of said impedances so that when the bridge is balanced no current flows through said second winding means and when the bridge is unbalanced a unidirectional current flows through said second winding means having a magnitude dependent upon the magnitude of said unbalance voltage to produce a second unidirectional field displaced in space approximately 90° from said first field and of a magnitude dependent upon the magnitude of the unbalance voltage so that a field is produced which is the resultant of said first and second fields to locate the magnetized portion of said rotor in an angular position corresponding to the quantity of fluid present in the container.

5. Apparatus according to claim 4 wherein the polarities of the bridge connections and of the connections for connecting the cathodes and anodes to the source are such that the unbalance voltage supplied to the control electrode of said first device is substantially 180° out of phase with the source voltage supplied to the anodes of said devices, whereby upon bridge unbalance the control electrode of said first device causes the current flowing through said first device and through said first impedance to have a value less than the value of the current flowing through said second device and said second impedance to an extent depending upon the degree of bridge unbalance.

6. Apparatus for measuring the quantity of a dielectric fluid present in a container, comprising a measuring condenser having its electrodes adapted for mounting in the container for immersion in the fluid therein to an extent depending upon the level of the fluid therein so that its capacitance changes with the fluid level, an electrical bridge having said measuring condenser connected in its measuring arm and having its input adapted to be electrically coupled to a source of alternating current to produce bridge balance when the container is empty and to develop in its output when there is fluid present in the container an unbalance voltage of a magnitude which is a function of the quantity of fluid present in the container, first and second electron discharge devices each having a cathode adapted to be electrically coupled to one side of the source and each also having a control electrode and an anode, fluid quantity indicating means having a permanent magnet rotor and having first and second field winding means wound at approximately 90° with respect to each other, means for passing a first unidirectional current through said first winding means to establish a first unidirectional field substantially constant in strength during the operation of said apparatus and tending to hold said rotor in a first angular position, means connecting one end of said second winding means to the anode of said first device and the other end of said second winding means to the anode of said second device, said second winding means being divided into two winding portions having an equal number of turns with the junction of said two portions adapted to be electrically coupled to the other side of the source, means for electrically coupling the control electrode of said first device to the output of said bridge to receive said unbalance voltage, means for biasing the control electrodes of said devices at substantially the same potential when said bridge is balanced so that said devices conduct simultaneously on the same half cycles of the source to an equal extent when the bridge is balanced thereby producing at substantially right angles to said first field two opposed fields of equal magnitude which nullify each other and when said bridge is unbalanced the current through said first device and its associated winding portion differs from the current through said second device and its associated winding portion thereby producing at right angles to said first field two opposed fields of unequal magnitude resulting in an effective unidirectional field which combines with said first field to position said rotor in an angular position corresponding to the quantity of fluid present in the container.

7. Apparatus according to claim 6 wherein the polarities of the bridge connections and of the connections for connecting the cathodes and anodes to the source are such that the unbalance voltage supplied to the control electrode of said first device is substantially 180° out of phase with the source of voltage supplied to the anodes of said devices, whereby upon bridge unbalance the control electrode of said first device causes the current flowing through said first device and its associated winding portion to have a value less than the value of the current flowing through said second device and its associated winding portion to an extent depending upon the degree of bridge unbalance.

8. Apparatus for measuring the quantity of a dielectric fluid present in a container, comprising a measuring condenser having its electrodes adapted for mounting in the container for immersion in the fluid therein to an extent depending upon the level of the fluid therein so that its capacitance changes with the fluid level, an electrical bridge having said measuring condenser connected in its measuring arm and having its input adapted to be electrically coupled to a source of alternating current to produce bridge balance when the container is empty and to develop in its output when there is fluid present in the container an unbalance voltage of a magnitude which is a function of the quantity of fluid present in the container, first and second electron discharge devices each having a cathode adapted to be electrically coupled to one side of the source and each also having a control electrode and an anode, fluid quantity indicating means having a permanent magnet rotor and having first, second and third field windings mutually displaced approximately 120° with respect to each other, means for passing first unidirectional current through said first winding to establish a first unidirectional field substantially constant in strength during the operation of said apparatus and tending to hold the magnetized portion of said rotor in a first angular position in alignment with said first field, means connecting one end of said second winding to the anode of said first device and one end of said third winding to the anode of said second device, said second and third windings having a junction point adapted to be electrically coupled to the other side of the source, means for electrically coupling the control electrode of said first device to the output of said bridge to receive said unbalance voltage, means for biasing the control electrodes of said devices at substantially the same potential when said bridge is balanced so that said devices conduct simultaneously on the same half cycles of the source to an equal extent when the bridge is balanced thereby producing in alignment with said first field two aiding field components and at right angles to said first field two opposed field components of equal magnitude which nullify each other and when said bridge is unbalanced the current through said first device and said second winding differs from the current through said second device and said third winding thereby producing at right angles to said first field two opposed field components of unequal magnitude resulting in an effective unidirectional field which combines with said first field to position said rotor in an angular position corresponding to the quantity of fluid present in the container.

9. Apparatus according to claim 8 wherein the polarities of the bridge connections and of the connections for connecting the cathodes and anodes to the source are such that the unbalance voltage supplied to the control electrode of said first device is substantially 180° out of phase with the source voltage supplied to the anodes of said devices, whereby upon bridge unbalance the control electrode of said first device causes the current flowing through said first device and through said second winding to have a value less than the value of the current flowing through said second device and said third winding to an extent depending upon the degree of bridge unbalance.

References Cited in the file of this patent

UNITED STATES PATENTS

| | | |
|---|---|---|
| Re. 23,493 | Edelman | May 20, 1952 |
| 2,280,678 | Waymouth | Apr. 21, 1942 |
| 2,338,732 | Nosker | Jan. 11, 1944 |
| 2,344,238 | Finch | Mar. 14, 1944 |
| 2,346,838 | Haight | Apr. 18, 1944 |
| 2,534,802 | Smith | Dec. 19, 1950 |
| 2,544,012 | Edelman | Mar. 6, 1951 |

OTHER REFERENCES

Publication: "Strain Gages" in Electronics, December 1943, pages 106 to 111 and 192. (Photostatic Copy in 73–88.5.)